June 19, 1962  B. D. LEE ETAL  3,040,294
METHOD AND APPARATUS FOR ANALYZING A
REPRODUCIBLE SEISMIC RECORD
Filed June 25, 1957  6 Sheets-Sheet 1

United States Patent Office 3,040,294
Patented June 19, 1962

3,040,294
METHOD AND APPARATUS FOR ANALYZING A REPRODUCIBLE SEISMIC RECORD
Burton D. Lee and Sam L. Wilkinson, Houston, Tex., assignors to Texaco Inc., a corporation of Delaware
Filed June 25, 1957, Ser. No. 667,894
11 Claims. (Cl. 340—15)

This invention is concerned with the analysis of seismic records. More specifically, it involves the analysis of seismic records which have been made on, or recorded in the form of, magnetic tapes.

In the earlier developments of seismic exploration, as employed in connection with exploration for oil in particular, the records which were taken involved the detonation of a charge of explosives to create a source of seismic energy in the earth. A record was taken of the seismic energy received at a series of points along the surface of the ground and as detected by various types of seismometers. As this procedure was carried out, there was produced only one record for each charge of explosive detonated. The record was in the form of traces on a photographic film as created by a multiple oscillograph that would record separate traces on the film strip for each of the seismometer pickup instruments, or more frequently, for each group of seismometers. Thus, it was not feasible to again reproduce the signals that were transformed by the seismometer from seismic into electrical energy, since these electric signals were dissipated in energizing the oscillograph to produce the photographic record.

More recently, a magnetic record comparable to the photographic type discussed above, is taken for each shot as the seismic energy is created. This comparable record is in the form of a magnetic tape recording. In this manner the information is recorded magnetically on the tape, so that a full spectrum of frequencies that are included in the signals created, will be faithfully recorded on the magnetic tape. Obviously, once recorded on the magnetic tape this information may be played back, or read off of the tape as many times as desired thereafter.

However, even with this situation as to a magnetic tape recording of the record, it has been discovered that there is a major difficulty which arises when an attempt is made to analyze or make adjustments to obtain the best record possible from the information as contained on the tape. This difficulty stems from the fact that these records, as made, have a duration of about five seconds or sometimes more. Consequently, the tape upon which this record is made has a record length that is in the neighborhood of three to five feet. This length is, of course, dependent on the speed of drive of the tape as the record is impressed thereon; but the speeds employed are such that a reasonable linear travel is employed for enabling the information to be impressed on the record without losing any of the desired frequencies included in the information, e.g., by reason of over-compressing the information should a speed that is too slow be employed. On the other hand, the speed may not be made excessive for the reason that this would create a length of record that would be impractical.

By playing back the information from the magnetic tape, after recording thereon, individual records could be made with different filter settings or with different relative positions of the pickup heads for each track, in order to analyze the results so as to make corrections and obtain the best record from the recorded data. However, using this "cut and try" method for analyzing and creating a given recording, would be extremely tedious and thus relatively impractical.

Furthermore, it is not satisfactory to take the output from a playback of a magnetic tape record and feed it to a cathode ray oscilloscope for observation, even if a large size cathode ray tube (e.g., a television set size) were to be employed. This is because the time consumed in scanning the complete record once would be much too long for being retained on the cathode ray tube until the next scanning cycle. The reason for this is, of course, that about five seconds is a much greater time than the persistence of the fluorescence obtained on the phosphores employed on the cathode ray tube face. Furthermore, if an attempt were to be made to overcome this difficulty by driving the tape record at a high speed so that its repeat frequency is rapid enough to allow display on a cathode ray tube, many attendant difficulties would appear. One difficulty would include the necessity of changing the filters involved in handling the seismic signals, to new higher frequency ranges while attempting to preserve amplitude and phase characteristics. Another difficulty would be in attempting to make the permanent record on film at the higher speed playback. The film paper drive would become unduly high speed; and the galvanometer frequency response range would have to be raised correspondingly with attendant problems.

In view of this situation it is an object of this invention to provide a method for displaying any desired short portion of a seismic record on a cathode ray oscilloscope, so that observed information may be analyzed, and desired corrections or changes be effectuated with direct observation of the results.

Another object of the invention is to provide a system for carrying out the aforementioned object of displaying a portion of a seismic record for analysis thereof.

Still another object of the invention is to provide a method of analyzing a seismic record wherein a desired short portion of the record is transferred from the record tape to a separate magnetic medium and repeated a number of times so that it becomes feasible to play back the repeated short portion of the record and display this portion on a cathode ray oscilloscope.

Another object is to provide improved apparatuses and/or improved combinations of elements of apparatus, for carrying out the invention.

Other more specific objects of the invention include the provision of an electronic circuit for generating a sharp timing signal by switching from a given frequency output signal to a relatively very different frequency output signal, instantaneously.

Briefly, the invention concerns a method of analyzing a seismic record wherein such a record has a time duration from beginning to end of an order of magnitude too great for a feasible repetition rate in making a display on a cathode ray oscilloscope. This method comprises the steps which include among others, the reading of a short time duration portion of said seismic record; the reproducing of said short time duration portion a plurality of times successively; and finally, the displaying of said short time duration portion on the cathode ray oscilloscope, the repetition rate being substantially equal to the reciprocal of said short time period.

The invention also may be described briefly as a system for analyzing a seismic record. The seismic record being analyzed, has a time duration from beginning to end of an order of magnitude too great for a feasible repetition rate in making a display on a cathode ray oscilloscope. The system comprises in combination, means for reading said entire seismic record from beginning to end. The combination also comprises means for reproducing a predetermined short time portion of said record a plurality of times successively. And the combination also comprises means for displaying said short time duration portion on said cathode ray oscilloscope, the repetition rate of said display being substantially equal to the reciprocal of said short time period.

Certain embodiments of the invention are described below in some detail by way of illustrative examples and are illustrated in the drawings in which:

FIG. 9 is a schematic circuit diagram illustrating in greater detail an electronic switch which may be employed in the systems of FIGS. 6 and 10;

Figure 1A:
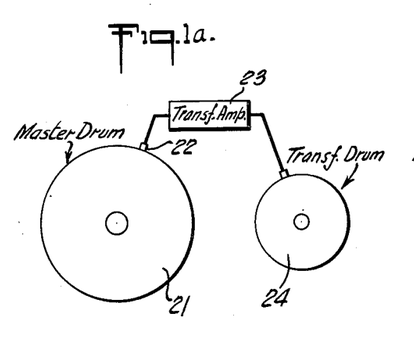
FIGS. 1a, 1b and 1c represent a schematic illustration of the elements employed in, and indicate some of the steps of, the invention.
Figure 1B:
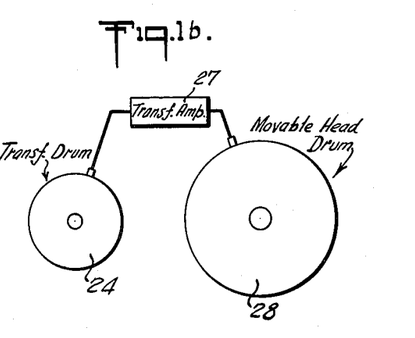
Figure 1C:
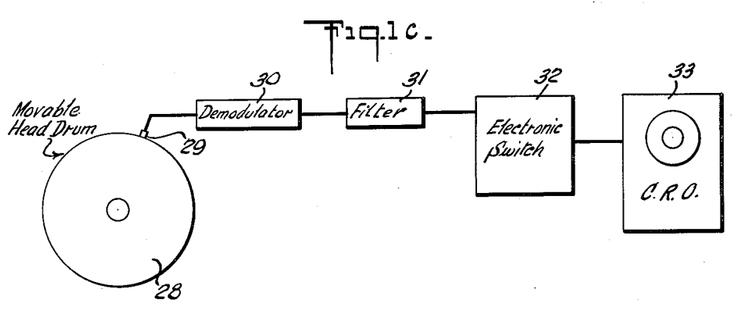

Referring to FIGS. 1a, 1b and 1c, the invention may be generally described as follows:

Beginning with a magnetic tape upon which has been impressed a seismic record, it is desired to view a short portion of the record for a relatively continuous period of time in order to analyze the contents thereof. Such tape will be wrapped around the peripheral surface of a master drum 21 (FIG. 1a). Then as the master drum 21 is driven at a relatively low speed, e.g., twelve r.p.m., for the usual five seconds record; the information on this magnetic tape will be picked up by a magnetic pickup head 22 and transferred via a transfer amplifier 23 to a relatively small diameter transfer drum 24. The transfer drum 24 will be rotated at a higher speed than the master drum 21, e.g., two hundred and forty r.p.m., so that only a given short portion of the record on the surface of the master drum 21, can be transferred in one revolution of the surface of the transfer drum 24. Now by determining at what point on the entire record (as contained on the surface of the master drum) that it is desired to analyze, transfer may be made of this portion to the surface of the transfer drum 24. Next, the data as carried on the surface of the transfer drum 24 may be transferred off repeatedly in succession form transfer drum 24 via a transfer amplifier 27 to a movable head drum 28 which has the same diameter as the master drum 21. The speeds of rotation of drums 24 and 28 will be related in a ratio of whole integers so that the short portion data will be laid down on the surface of the movable head drum 28 a whole number of times. For example the speeds indicated above for drums 21 and 24 could be employed for drums 24 and 28 so that twenty complete lay downs of the short portion following in succession would be made on drum 28. This latter step of re-transfer of the data from the smaller diameter transfer drum 24 to the movable head drum 28 to be ready for analysis, is illustrated in FIG. 1b.

Then as a final step in the process of analyzing a given portion of the record, the data carried by the movable head drum 28 will be read out. In describing this step, reference may be had to FIG. 1c where it may be observed that movable head drum 28 is now connected for reading the data thereon by means of a pickup head 29 and a demodulator 30. Then the signals continue through a filter 31 to an electronic switch 32, and from there to a cathode ray oscilloscope 33 where the data may be displayed substantially in the form illustrated in any of FIGS. 3, 4 or 5, except that these waves are being impressed on the face of the cathode ray oscilloscope where they may be directly observed so as to note any changes as they may occur. It is again pointed out that the short portion of the record which was transferred from the transfer drum 24 to the movable head drum 28 was laid down on the movable head drum 28 a whole number of times successively around the periphery thereof. Consequently, as the signals are read off from the movable head drum 28, according to the schematic illustration of FIG. 1c, the short portion of the record is continuously repeated at a rate which is rapid enough so that this portion of the record may be displayed on the cathode ray oscilloscope without any difficulty due to the length of time involved in completing the information which is repeated.

Figure 6:
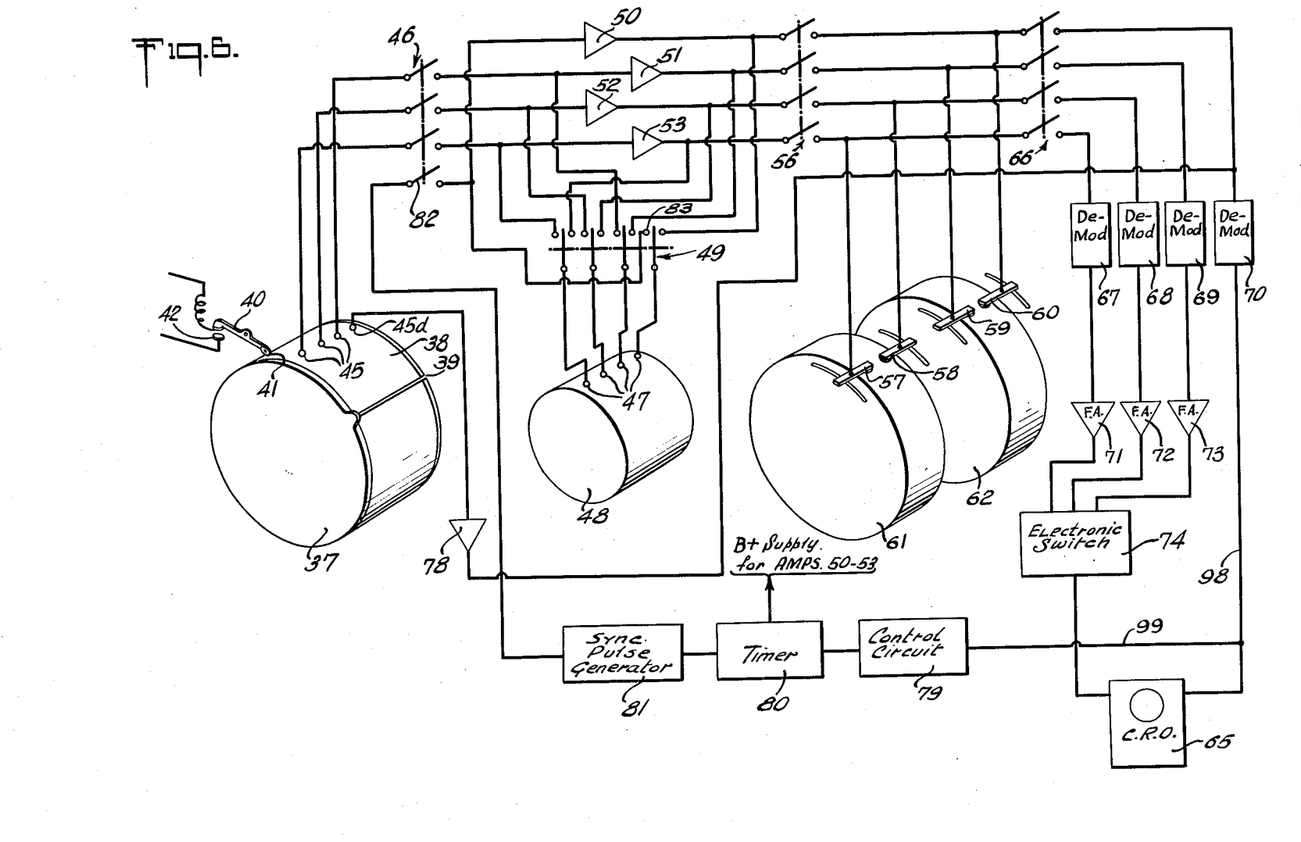
FIG. 6 is a schematic showing of the entire system in accordance with a preferred modification of the invention.

*Figure 6 System*

Turning now to a more specific showing of apparatus embodying, and for carrying out, the invention; reference is had to FIG. 6 where a complete system, in accordance with the basic description given above, is illustrated. The elements shown in FIG. 6 include a master drum 37, which has on the peripheral surface thereof a magnetic tape 38 that is wide enough to include, on separate tracks in parallel, thirteen separate channels of recorded data. These are indicated by the thirteen traces on the sample record illustrated in FIG. 2.

In the circuit diagram part of FIG. 6, there are illustrated only four tracks for pickup heads in connection with the tape 38 and drum 37. This is done in order to simplify the showing and maintain better clarity of the description. It will be appreciated that some number other than thirteen traces might be employed depending upon the particular apparatus used in carrying out the invention.

The magnetic tape 38 may be fastened on to the surface of the drum 37 in any convenient manner, such as by means of clamping the ends of the tape 38 within the structure of the drum 37 using any feasible arrangement (not shown) as desired. It will be observed that there is a transverse slit 39 across the peripheral surface of the drum 37, and both ends of the magnetic tape 38 extend through the slit 39 for fastening on the inside of the drum, as just indicated.

There is a cam-actuated type of switch 40 located adjacent the periphery of drum 37 near one edge thereof. This switch 40 has a follower wheel 41 which normally rests close to but not in contact with one edge of the drum 37. There is a cam in the form of a protuberance 43, located on the edge of the drum 37 directly in the path of the wheel 41, relative to drum 37. Thus as the cam 43 makes contact with wheel 41, the switch 40 closes its contacts 42, once each revolution of the drum 37, to mark the beginning or ending of each complete scanning cycle of the magnetic tape 38. It will be noted that in the schematic showing of FIG. 6, the cam or protuberance 43 might be integrally constructed with the edge of drum 37. Or, it might be constructed as a separate unit that fits into the slit 39, at the edge of the drum 37 so that it will contact wheel 41.

The reason the wheel 41 of switch 40 is maintained normally out of contact with drum 37 is to eliminate any undesirable "noise" in the transfer operation. It will be appreciated that another arrangement that could be employed, in order to avoid any undesired extraneous signals during the transfer operation from the magnetic tape 38, would be one employing a photo cell and light beam. For example, there could be a light source (not shown) within the drum 37 so that a light beam would be projected out radially through the slit 39. Then a suitably located photo cell (not shown) would receive the light from such beam once each revolution, and the photo cell would actuate a relay (not shown) to close contacts (not shown) that would replace the contacts 42 of the cam actuated switch 41. Of course, other arrangements with a photo-cell or other photo-electric device could be employed, and many different arrangements will suggest themselves to one skilled in the art.

There are a plurality of dynamic pickup heads 45 located adjacent to the surface of tape 38. These pickup heads 45 are spaced transversely across the width of the magnetic tape 38. Each head cooperates with a corresponding track on the record as previously impressed on to magnetic tape 38 at the time that the original record was made in the field. The electric signals that are created by these pickup heads 45, are carried over the indicated circuits to a gang switch 46. Circuits for carrying these signals beyond switch 46, include those which lead directly from the contacts of gang switch 46 to a corresponding group of magnetic read-write heads 47. Read-write heads 47 are located adjacent to the surface of a high speed, relatively short circumference, drum 48. These read-write heads 47 on drum 48, are connected to the common circuit side of a double throw gang switch 49. The other contacts of each individual switch member of switch 49, are connected respectively to the output and input sides of a plurality of amplifiers 50, 51, 52 and 53. Thus, the high speed drum 48 (which has on its surface a magnetizable material similar to the material carried by magnetic tape 38) may be connected alternatively to the output or the input sides of the amplifiers 50-53.

The plurality of circuits may be alternatively connected via another gang switch 56 which has one set of contacts connected directly to the circuits which lead to the outputs of amplifiers 50-53 and also to the contacts of one side of the gang switch 49. The other set of contacts of gang switch 56 are connected to a set of read-write heads 57, 58, 59 and 60. These read-write heads 57-60 are adjustably supported adjacent to the peripheral surfaces of a plurality of adjustable head drums 61 and 62. It will be appreciated that adjustable head drums 61 and 62 might be a single unitary drum; but, in order to provide for the adjustments longitudinally along the record tracks under each of the read-write heads 57-60, it was found convenient to employ separate drums for each pair of record tracks. Thus, in the usual apparatus where there are 12 traces of recorded information on the magnetic tape plus a 13th trace to carry additional information, such as the time break and synchronous pulses, there would have to be seven separate two track drums to provide for the type of adjustable head mounting illustrated.

The plurality of circuits may be again alternatively carried from the pickups on the adjustable head drums 61 and 62, to a cathode ray oscilloscope 65 for observation. The circuits for this connection include another gang switch 66 that has one set of contacts connected to the inputs of a plurality of demodulators 67, 68, 69 and 70. The outputs of demodulators 67, 68 and 69 are carried to the inputs of combined filter-amplifiers 71, 72 and 73 respectively. The outputs of these filter-amplifiers 71, 72 and 73 are in turn connected to the inputs of an electronic switch 74. The details of this electronic switch will be described below in connection with FIG. 9, but it is sufficient for this general description to point out that the output of electronic switch 74 is connected directly to the input of cathode ray oscilloscope 65.

The specific circuits for filter amplifiers 71, 72 and 73 form no part of this invention, per se. Therefore, no detailed circuit showing is made. It will be understood that the filter components of these elements are adjustable in order to be able to vary the characteristics of the output signals by varying the attenuation or elimination of given frequencies or frequency bands from the signals as they are transmitted through. The frequencies that are thus eliminated are preferably variably chosen by adjustments in like manner.

In connection with the control action that is involved in carrying out the invention employing a system according to FIG. 6, there is an auxiliary control circuit that is employed in conjunction with the control track on the record. This control circuit may be followed on the drawings beginning at pickup head 45d and going to the input of a bridging amplifier 78. The output of amplifier 78 is connected to the input of the demodulator 70 directly. Then the circuit may be continued from the output of demodulator 70 to the input of a control circuit 79 that is illustrated in more detail in FIG. 7. Control circuit 79 has an output that is connected to an input of a counter, or timer, 80 which may take various forms including, for example, that of a commercially available counter, sold by the Atomic Instrument Company under the designation Industrial Pre-set Counter, Model 164. Then an output from the timer 80 controls an input to a synchronous plus generator 81 that may take the form illustrated in greater detail in FIG. 8. Finally, the output of synchronous pulse generator 81 is connected via one of the switch blades 82 of gang switch 46 to the circuit that leads to the input of the amplifier 50. Thus, depending upon the position of switches 46 and 49, there are alternative circuits involving the control track information as well as the record data channels of the system.

It is pointed out that the arrangement is such that cam switch 40 is used to control a relay circuit (not shown) for turning on and off the B+ supply to amplifiers 50-53 at the beginning and end of a revolution of the drum 37. This is in series with another control for the B+ supply for these amplifiers which is connected to the counter 80 and which will be described more fully below.

Referring to FIG. 6 and in connection with the elements described above, a method according to this invention may be described in general as follows:

Beginning with the magnetically recorded record that is contained on the tape 38, a predetermined short portion of this record is read out on to the relatively small diameter high speed drum 48. This step is carried out with the gang switch 46 closed and with the gang switch 49 actuated to the right (as viewed in FIG. 6), so that the pickup heads 45 of the magnetic master drum 37 are connected to the inputs of amplifiers 51, 52 and 53 the outputs of which are thus connected to corresponding read-write heads 47 on the high speed drum 48. The data from magnetic tape 38 is transferred and read out on to the surface of the high speed drum 48 along corresponding tracks around the peripheral surface of drum 48. Since the high speed drum 48 in one complete revolution can only accommodate a relatively short portion of the entire record on magnetic tape 38 an arrangement is made to transfer only a desired portion of the whole record on tape 38. The details of how this predetermined portion is chosen and transferred will be set forth below.

Following completion of the transfer of the desired portion of data from tape 38 to the surface of high speed drum 48, the switch 46 will be opened and switch 49 will be transferred from its right hand position to its left hand position (as viewed in FIG. 6) so that the read-write heads 47 will become connected to the inputs of amplifiers 50-53. At the same time, the gang switch 56 will be closed and thus the data as read out from high speed drum 48 via read-write heads 47 will be amplified and transferred to the corresponding read-write heads 57-60. Thus, the data will be then transferred a plurality of times successively (once for each revolution of drum 48) to the magnetic material surfaces of the adjustable-head drums 61 and 62. Since the adjustable head drums 61 and 62 are of the same effective diameter as the master drum 37, and they are rotated at the same speed, i.e., twelve r.p.m., the short portion of record data will be written down on the surfaces of drums 61 and 62 a whole number of times for one revolution of the adjustable head drums. This latter transfer will normally be carried out with the adjustable heads of 57–60 set all in line with one another transversely, i.e., parallel to the axis of the drums 61 and 62. Drums 61 and 62 will ordinarily be fixed to a common shaft. Control of the transfer onto drums 61 and 62 includes a cut off of the transfer after one full revolution. This may be carried out by using the relay circuits (not shown) described above, in connection with cam actuated switch 40. This because drums 37 and 61, 62 are the same size and are rotated at the same speed.

Next, following the completion of application of the data to the surfaces of adjustable head drums 61 and 62, the switch 56 will be opened and switch 66 will be closed. After this, as drums 61 and 62 are rotated, the information as picked up by read-write heads 57–60 will be transferred over the respective circuits associated with each to the inputs of the demodulators 67–70 respectively. Thus, electric signals representing the data on adjustable head drums 61 and 62 are now carried via the respective circuits illustrated to the demodulators. Then following demodulation in the record data channels, the signals are carried to the filter amplifiers 71, 72 and 73. In the control data channel, the control information from read-write head 60 is passed on from the demodulator 70 directly to the cathode ray oscilloscope 65. The signals are passed on from amplifiers 71, 72 and 73 to the electronic switch 74 where they are treated in such a way as to provide for their introduction to the input of the cathode ray scope 65 so that oscilloscope may display these signals in visible form similar to the traces illustrated in FIGS. 3, 4, and 5, except that the illustrated waves are photographic reproductions of the signals as made by a multiple trace oscillograph rather than a display on the face of the cathode ray oscilloscope.

The control signals that care carried via demodulator 70 to the oscilloscope 65, consist of a synchronous pulse at the beginning of each repeated portion of the record, as carried on the drums 61 and 62. This acts to maintain the horizontal sweep frequency of the oscilloscope in exact synchronism with the repeat frequency of the short portion of record that is being analyzed.

Throughout the foregoing description with illustrations, the type of magnetic recording employed is A.C. in nature and makes use of frequency modulation to record the seismic data on a relatively high frequency carrier. This will be discussed more fully below.

Now it will be clear that with the apparatus shown in FIG. 6 a method of analyzing a short portion of a seismic record on a cathode ray oscilloscope for a continuous observation thereof, may be carried out in accordance with the foregoing.

Figure 10:
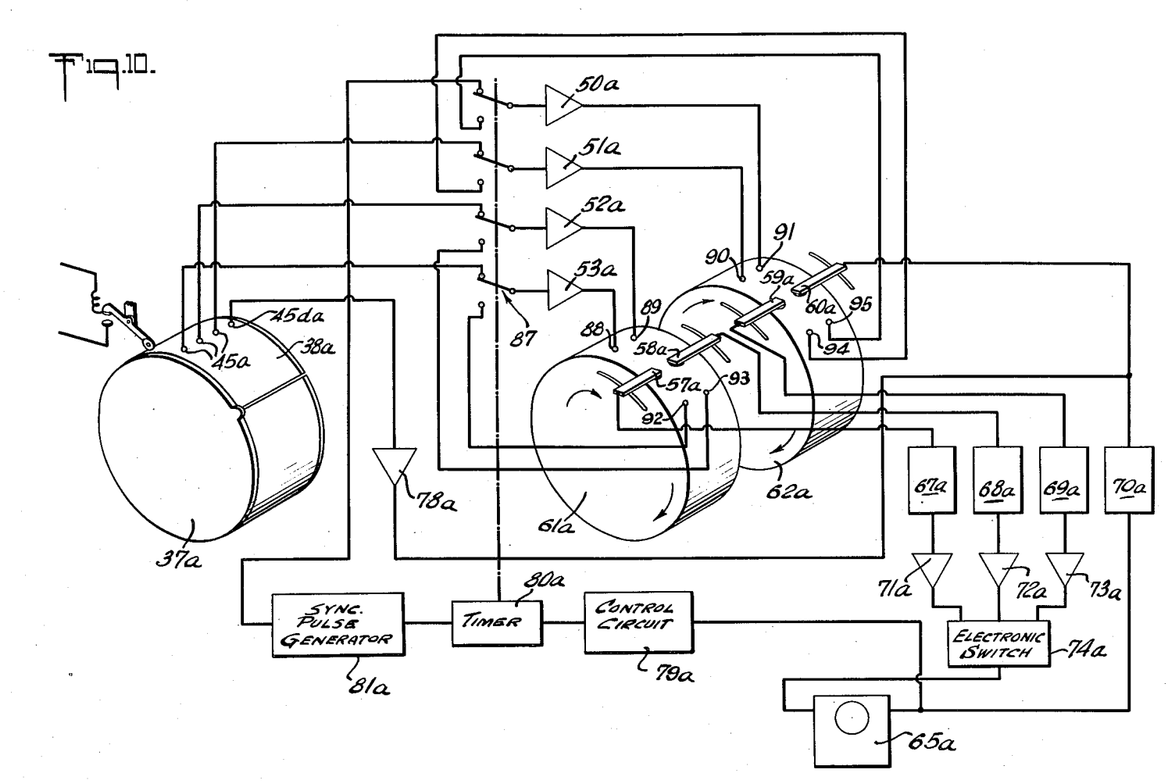
FIG. 10 is a schematic illustration of a different embodiment of the invention.

*Figure 10 System*

In FIG. 10, there is illustrated an arrangement for carrying out the invention without the use of a high speed, small diameter, intermediate drum. In this method, the same overall results are obtained and many of the elements employed are the same as those illustrated in FIG. 6. Therefore, in describing this method and the apparatus for carrying it out, the reference numbers employed for corresponding elements will be the same numbers as used in FIG. 6 with the addition of a subscript "a." It will be observed, however, in the FIG. 10 arrangement that there is not required to be any "whole integer" relationship between the master record and the segment to be viewed.

There is a master drum 37a that has pickup heads 45a located adjacent to the surface thereof and also has a magnetic tape 38a stretched around the circumference of the drum. In this system, the circuit connections include a gang switch 87 that is actuated under control of the timer 80a and there is a set of amplifiers 50a, 51a, 52a and 53a. The adjustable head drums 61a and 62a, have in addition to the adjustable read-write heads 57a–60a, one additional set of magnetic write heads 88, 89, 90 and 91 plus one additional set of read heads 92, 93, 94 and 95. These read and write heads are located at the beginning and end of a short sector on the circumferential surfaces of drums 61a and 62a. This short sector portion of the surfaces of drums 61a and 62a is comparable to the circumferential length of the surface of high speed drum 48 in the above described modification.

It is to be noted that in the illustration of FIG. 10, the size of the arcuate spacing of write heads 88–91, from read heads 92–95 is greatly exaggerated for the purposes of clarity. This will be duly appreciated when it is pointed out that according to the above indicated specific example of apparatus in conformity with this invention, the master drum 37 is rotated at twelve r.p.m. for a five second record. Furthermore, it may be desirable to lay down on the adjustable head drums 61 and 62 a quarter second portion of the record. Thus, the arcuate spacing between the read and write heads of this FIG. 10 modification would be only eighteen degrees rather than the something over forty-five degree spacing illustrated.

The remainder of the apparatus illustrated in FIG. 10 includes the corresponding demodulators 67a–70a, and filter amplifiers 71a, 72a, and 73a, as well as the electronic switch 74a, the cathode ray oscilloscope 65a, the control circuit 79a, the already mentioned timer 80a and the synchronous pulse generator 81a.

In general the steps involved in carrying out the invention in accordance with the FIG. 10 modification, include the following:

Master drum 37a is rotated and the data carried by magnetic tape 38a, is picked up by pickup heads 45a and transferred via the illustrated circuits to the inputs of amplifiers 51a, 52a, and 53a for the three record-data tracks of the traces carried by magnetic tape 38a. This is true since the gang switch 87 will be in the position illustrated for this step of the operation, i.e. up as viewed in FIG. 10. Thus, beginning at a given point on the record of magnetic tape 38a the data will be transferred via the amplifiers 51a–53a and written on to the magnetic material surfaces of adjustable head drums 61a and 62a, via the write heads 90, 89, and 88 respectively. Now as soon as the transferred data that is being written onto the surfaces of drums 61a, and 62a reaches the read head pickups 94, 93 and 92, respectively, (due to the rotation of drums 61a and 62a) the gang switch 87 will be actuated by the timer 80a to switch its contacts over to the downward position, when viewed as illustrated in FIG. 10, and then the read or pickup heads 92–95 will read the information passing thereunder and transfer it to the inputs of amplifiers 53a, 52a, 51a and 50a respectively. Thereafter the recorded short portion of the original record contained on magnetic tape 38a will be repeatedly picked up at the heads 92–95 and re-written back onto the drums 61a and 62a at corresponding write heads 88–91 for the successive repetition of the information that is to be displayed for analysis.

Once this introduction of the information into a circulating status has been completed, or even as the first lay down is being made, the remaining steps of the process are substantially identical with those described above. Thus, the short portion of the record which is to be observed is picked up as the drums 61a and 62a rotate past the adjustable read heads 57a–60a, and is carried directly to the inputs of demodulators 67a–70a. The outputs of these demodulators are carried to the inputs of filter amplifiers 71a, 72a and 73a plus the synchronous control input for cathode ray oscilloscope 65a. Then the output of amplifiers 71a and 73a are carried to the input of an electronic switch 74a and the output thereof is connected to the signal input circuit for cathode ray oscilloscope 65a.

The control channel circuits for this modification are similar to those described above in connection with FIG. 6, and may be briefly followed by tracing the circuit beginning at the control trace pickup head 45da to the input of a bridging amplifier 78a and from the output there of to the input of the demodulator 70a. From the output of demodulator of 70a the control signals, for the first transfer of information from magnetic tape 38a, may be followed to the input of control circuit 79a for controlling the start of timer 80a. In this case the timer is arranged to provide for directly controlling actuation of the gang switch 87 so as to determine the location of the short part of the record that is to be transferred. The output of timer 80a also includes a signal into the synchronous pulse generator 81a that feeds its output to the input of amplifier 50a for applying a synchronous pulse to the track on drum 62a under write head 91.

The more detailed aspects of the operation of this FIG. 10 modification of the invention, will be made clear below in connection with the details to be described for the comparable elements that are employed in the modification illustrated by FIG. 6. Consequently, no detailed description of the operation of the FIG. 10 system need be set forth as specifically related thereto since such application of these details will be clear to anyone skilled in the art.

*Detailed Circuits*

Figure 7:
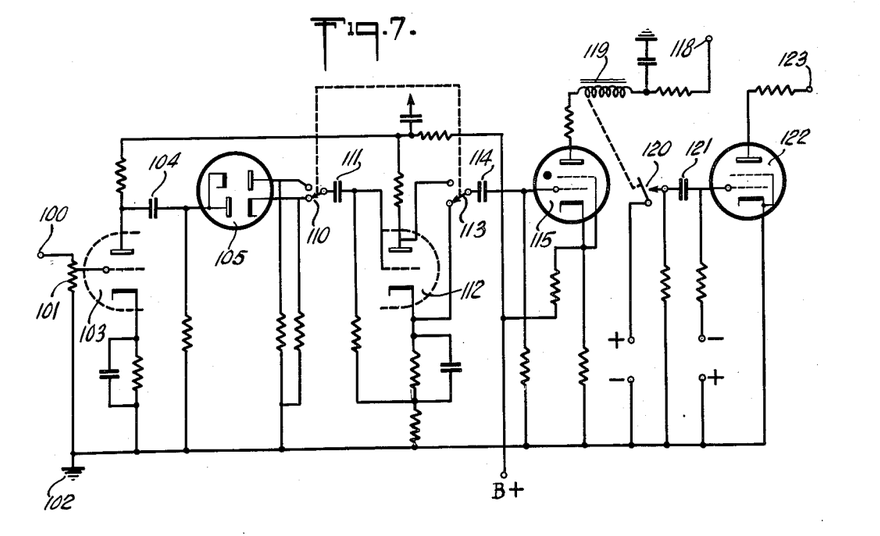
FIG. 7 is a schematic circuit diagram illustrating in greater detail the control circuit element which may be employed in FIGS. 6 and 10.
Figure 8:
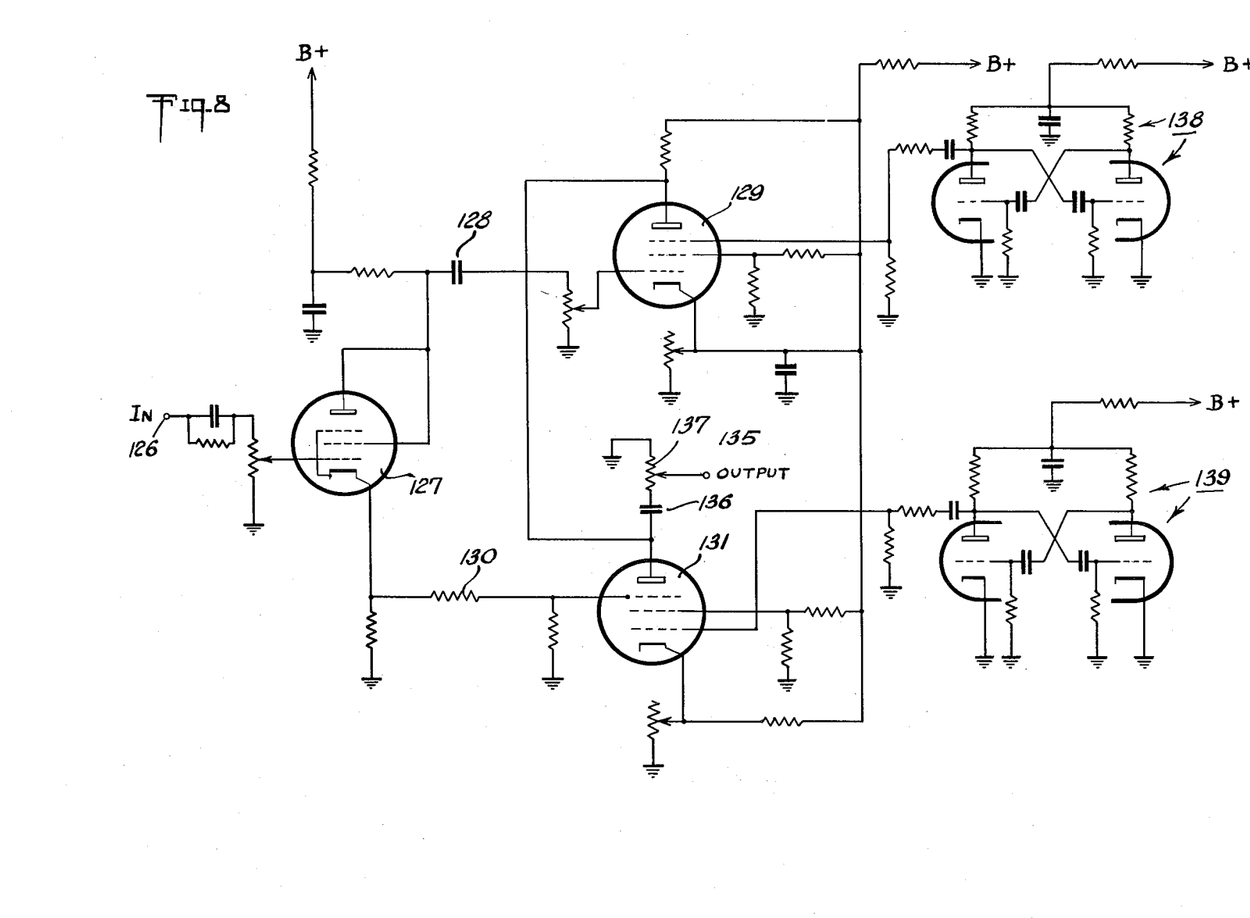
FIG. 8 is a schematic circuit diagram illustrating in greater detail one form of synchronous pulse generator which may be employed in the systems of FIGS. 6 and 10.

In order to clarify the details of the generic and specific methods, as well as the specific elements of the apparatus, and their inter-relation, reference is now made to FIG. 6 along with FIGS. 7, 8 and 9 which illustrate schematically the specific circuits employed.

First of all, the operation of the control aspects of the carrying out of the invention according to the FIG. 6 modification, will be described. To begin with, master drum 37 will be driven at a constant speed, e.g. twelve r.p.m. Once each revolution of the drum 37, contacts 42 of switch 40 are closed, momentarily. As indicated above, contacts 42 are arranged in a "set and trip" relay circuit (not shown) so that the plate supply for the amplifiers 50-53, is switched on at the beginning of a scanning revolution of the drum 37 and off again at the end thereof.

To begin the transfer operation, the gang switch 46 is closed (this may be done manually) to connect the above described circuits from pickup heads 45 to inputs of amplifiers 51-53. As soon as the beginning of the magnetic tape 38 has been rotated past pickup head 45d, the control circuit 79 will be energized so that when the "time break" signal appears, it will be amplified by amplifier 78 and carried over the illustrated circuit to the input of demodulator 70. From the output of demodulator 70, the "time break" signal is carried via a circuit wire 98 and another circuit wire 99 to the input of control circuit 79. This input of control circuit 79 is illustrated in FIG. 7 as input terminal 100 to which the circuit wire 99 is connected.

Then the signal continues over the circuit illustrated (see FIG. 7) which is a usual impedance matching input circuit that includes a potentiometer type connection in conjunction with a resistor 101. Resistor 101 has the other side thereof (opposite from that connected to 100) connected to ground as illustrated and indicated by reference numeral 102. The signal is then amplified in a thermionic tube 103 and passed on via a capacitor 104 to a predetermined path through a double diode tube 105. The path which the signal takes through double diode 105 is selected by a set of contacts 110 of a double throw switch in accordance with whether the time break signal was positive or negative in direction. The time break signal then continues via a capacitor 111 to the input of another thermionic tube 112. Which of two outputs from tube 112 is effective, has been selected by a ganged set of switch contacts 113 that are actuated simultaneously with contacts 110, so as to select a corresponding circuit depending upon which path through the double diode 105 was selected. This latter selection in turn, having been dependent on the characteristic of the time break signal, i.e., whether positive or negative. In the circuit as illustrated, the signal continues via the cathode circuit of tube 112 and over the closed contact of switch 113 to a capacitor 114, which passes the signal to the input of a tetrode tube 115. Tetrode 115 is a thyratron tube so that once the signal has caused this tube to fire, it will remain in a conducting state in accordance with the usual characteristic of a thyratron, until the high voltage supply to the plate of this tube has been cut off.

In this connection, it is pointed out that a terminal 118 is for connecting a high voltage plate supply to the thyratron 115. However this high voltage or B+ supply, is under control of a common B+ supply mentioned above, that acts to terminate the transfer of signals through the transfer amplifiers at the end of the predetermined short portion of the record, or alternatively at the end of a complete revolution of drum 37.

It will be noted that there is a relay coil 119 that is in the plate circuit of thyratron 115. This coil 119 controls the actuation of switch contacts 120 for creating a square wave control pulse without the usual noise from the operation of a mechanical switch. Such control pulse will initiate the timing action of timer 80.

Now it will be clear that when the signal transmitted from the time break data on the record (control track of channel) reaches the thyratron 115, the thyratron is fired and causes the relay 119 to be actuated. Relay 119 then closes the contact of switch 120 to supply a positive voltage to one side of a capacitor 121 which is therefore charged and passes on a positive pulse signal to the grid of a tube 122. The plate of tube 122 is connected via an output terminal 123 to a common cathode line in the timer 80. The positive pulse reaching the grid of tube 122 causes the tube to fire and a conductive path is established and maintained between the common cathode line in the timer and ground. Tube 122 acts as a switch that is closed by the positive pulse applied to the grid and remains closed for the duration of the timing cycle.

The duration of the timing cycle may be set by manual controls on the timer, so as to run off a given length of time from the commencement of this timing cycle and at the end thereof to actuate a relay for carrying out the dual functions of switching off the B+ supply of the tranfer amplifiers 50-53 and in addition provide an output pulse, e.g., by means of another swiching circuit, which is passed on to the input of the synchronous pulse generator 81. Thus, the function of the counter or timer 80 is to determine the end point of the chosen short portion of the record on magnetic tape 38, and at this time to cut off the transfer of data from master drum 37 to the high speed drum 48. At the same time as the cut off of the transfer information (by opening the high voltage supply to the amplifiers), a synchronous pulse is created in synchronous pulse generator 81 and passed through amplifier 50 prior to the opening of its high voltage supply, to be written onto the control track of the high speed drum 48. This synchronous pulse is laid down to act as a marker of the beginning and end of the given short portion of the record.

At this point, it may be noted that throughout the description of the illustrated apparatus, the magnetic information recording is of a type employing frequency modulated magnetic information that is impressed on the magnetic material of magnetic tape 38 as well as on the surfaces of high speed drum 48 and adjustable head drums 61, 62. Such a system of magnetic recording for seismic data is described in the patent to Burton D. Lee and Gerhard Herzog, No. 2,620,890, issued December 9, 1952. In that patent, this type of magnetic recording is illustrated and described in connection with FIG. 2 of that patent. In this type of magnetic recording, it is not necessary to employ an erase head, or other mechanism, for erasing the magnetic signal that has been impressed on a given track of magnetic material before writing new data on such track. This is because of the nature of this type of frequency modulated magnetic recording, wherein the carrier frequency is relatively high and the amplitude thereof is great enough to insure that the magnetic material under the write head at any given swing of the carrier signal, is driven beyond saturation so that whatever condition of magnetization existed prior to the application of the carrier signal being impressed, it is wiped out and the new state of magnetization according to the then introduced signals will be applied. Thus, irrespective of whether the write head is energized with a modulated signal or not, the magnetic material is magnetized in accordance with the information being applied to the write head while erasing all pre-existing information. Consequently, when a given short portion of the whole record on tape 38 is to be transferred to the surface of drum 48, it is merely necessary to determine the end point of this portion of the record. Then when such end point is reached, the transfer of data from the master drum 37 to the high speed drum 48 will be terminated; and the data then standing on the high speed drum 48 is the desired short portion of the record 38.

To make this clear, let us assume that the desired short portion of the record on tape 38 is located at a distance beyond the beginning of the record on tape 38 equal to five and one-half revolutions of the high speed drum 48. Then the operation will be such that transfer of the data from the master drum, beginning at the start of the record on tape 38, will take place and be transferred to the surface of high speed drum 48 continuously. However, as each complete revolution of drum 48 takes place, the data which was already transferred to this drum on the previous revolution will be merely wiped out and replaced by the incoming data as the master drum 37 progresses. Consequently, under our assumed situation as soon as the master drum 37 has progressed beyond the beginning of record on tape 38 a distance equal to four and one-half revolutions of high speed drum 48, the data transferred from that point until the next full revolution of drum 48 will be that data which remains on drum 48 following the cut off of the transfer (by reason of removing the high voltage supply of amplifiers 50–53).

The remaining details of the operation are straightforward in that after switching by opening gang switch 46 and closing gang switch 56, as well as shifting multiple switch 49 from its right hand to its left hand contacts as viewed in FIG. 6, the data on drum 48 (which is the desired short portion of the record) will be transferred from high speed drum 48 onto the adjustable head drums 61 and 62 a plurality of times in succession until one complete revolution of these large drums 61 and 62 has been carried out. Finally the switches will be changed again for reading off the data from drums 61 and 62 to transfer the same into the cathode ray oscilloscope for display thereby. The latter involves merely opening gang switch 56 and closing gang switch 66.

Although various arrangements could be had for providing a synchronous pulse to be written onto the control track of high speed drum 48, it is preferred to use a synchronous pulse generator in accordance with this invention. This pulse generator makes use of a switching electronically from the application of one relatively low frequency to another signal a relatively high frequency. This switching is carried out practically instantaneously to thus create in effect a square wave pulse on the track of the drum 48, by reason of this relatively instantaneous shift of the carrier frequently applied to the contral track write head.

Referring to FIG. 8, a schematic circuit showing such a synchronous pulse generator is illustrated. The input pulse as received from the timer 80 is applied to an input terminal 126. This pulse is then applied to the grid of a tube 127 via a potentiometer type input circuit. Tube 127 is connected in a dual output type of circuit such that the input pulse introduced at terminal 126 and applied to the grid of the tube 127 will create an output signal in the main current path through tube 127. The plate circuit output is passed on via a capacitor 128 to the control grid, or input circuit, of a gate tube 129. The other output circuit from tube 127 is a cathode follower output connection that is passed on via a resistor 130 to the suppressor grid of another gate tube 131. The gate tubes 129 and 131 are arranged so that in the absence of any signals, one of the gates is opened while the other is closed. This means that the gate which is opened is passing a signal from a connection to a multivibrator that is oscillating at a relatively high or at a relatively low frequency as desired. Thus, one of these two frequencies is being passed to the output circuit for the entire synchronous pulse generator 81, which output is common to both gate tubes 129 and 131 and includes an output terminal 135 which is connected to the plates of the gate tubes via a capacitor 136 and a grounded resistor 137 which has a variable potentiometer-tap connection thereon for determining the attenuation of the output.

There are two multivibrators 138 and 139 that each employ a pair of triodes (two halves of a twin triode tube). The output of multivibrator 138 is connected to the suppressor grid of gate tube 129, while the output of multivibrator 139 is connected to the control grid of gate tube 131. It will be clear to anyone skilled in the art that each of these two separate multivibrators 138 and 139 may be so arranged as to provide a given output frequency, depending upon the circuit constants employed. Thus, for example, the multivibrator 138 is arranged to provide a six kilocycle signal while the other multivibrator 139 provides a 2300 cycle signal. Thus, the above indicated will take place as the input pulse received from timer 80 at input terminal 126 causes a sudden shift in the output signal at terminal 135 from the six kilocycle signal that is being passed by the open gate to the 2300 cycle signal which will then be passed by the other gate as it is opened momentarily, during which time the first gate will be closed. This arrangement allows the direct recording of the steep front pulse created, without the need for modulating a carrier signal. Furthermore the wave front of this pulse is practically perpendicular. In order to even approach this slope, on the wave front of a pulse created by modulating a carrier, would be relatively difficult.

FIG. 9 illustrates a schematic circuit for the electronic switch 74 or 74A. The principles of operation of this switch are well known, and reference may be had to two articles which describe the theory of the operation for the two components of this type of electronic switch. One article deals with a ring counter and may be found in the March 1948 issue of "Electronics Magazine" pages 122–125 entitled "High-Speed N-Scale Counters" by T. K. Sharpless. The other publication, which describes the operation of the switching portion of the electronic switch circuit, is an article entitled "Four Channel Electronic Switch" by N. A. Moerman, published in "Electronics" on April 1946, pages 150 through 153.

Briefly, the operation of the electronic switch 74 that is employed in FIG. 6 and shown in greater detail in FIG. 9, may be described in connection with FIG. 9 as follows: the signals introduced to the electronic switch from filter amplifiers 71, 72 and 73 (FIG. 6) are introduced at input terminals 141, 142 and 143 (FIG. 9) which are indicated by captions as channel one, channel two and channel twelve respectively. Thus, it will be appreciated that in the illustrated records made from a magnetic tape, there are twelve channels employed, one for each trace on the record. The thirteenth channel is a control signal channel as indicated above. Therefore in FIG. 9, an indication is made of additional channels between channel two and channel twelve. Whereas, in FIG. 6 only three record-information channels are illustrated for purposes of clarity.

The information is introduced to the electronic switch on all of the record channels simultaneously, as it is picked up by the magnetic pickup heads 57, 59 on drums 61 and 62, and transmitted via demodulators 67–69 and filter amplifiers 71–73. The action of the electronic switch will be clear upon observation of the action of one channel thereof. It is to be understood that the signals being introduced on the various channels are continuous, and similar in nature, although each signal is individual and distinct as derived from its own channel, or track, on the drums 61 and 62. Referring to channel one, the signals introduced at input terminal 141 are applied to the control grid of a gate tube 144. The output of gate tube 144 is in parallel with the outputs of corresponding gate tubes 145 and 146 of the other two channels illustrated. These parallel outputs all are applied to an output terminal 147 that has a caption thereon indicating the fact that this output is applied to the cathode-ray oscilloscope. The signals in channel one are therefore passed on to the input of the cathode ray oscilloscope, whenever the gate tube 144 is biased to a conductive state. This only happens momentarily once each time a ring counter 148 completes a full swing around the ring. The gate tube 144 is maintained biased beyond cut-off the remainder of the time, by reason of a bias on a common bias circuit 149 that is marked "Neg. Bias." This gate opening pulse is received on the same grid of the gate tube 144 that has the first mentioned bias connected thereto. The gate opening pulse that renders tube 144 conducting is received from a twin triode tube 150 that is connected as a flip-flop circuit. Thus, whenever the left hand side of tube 150 (as viewed in FIG. 9) becomes non-conductive, a point 151 in the plate circuit thereof rises to the full B+ potential, and this potential rise is passed on via a capacitor 152 and a resistor 153 to the grid of tube 144.

It is pointed out that each gate tube 144, 145 and 146 has a variable cathode resistor 154, 155 and 156 respectively. These resistors 154, 155 and 156 are adjusted to a series of different values in a direct sequential order so that the operating bias (or no signal level) when these tubes are conducting, will be different in each case. This difference will be arranged in a series of sequential steps to provide corresponding levels on the face of the cathode ray tube. This means that whenever one of the gate tubes, e.g. 144, is conducting, the beam of the cathode ray tube will be caused to take up a "zero" line, or no signal position, at a vertical location separate from that for all the other gate tubes. Consequently, the whole group of signals representing the traces on the record being analyzed, may be displayed at once and provide on the face of the oscilloscope tube a dynamic view of the portion of the record that was picked out which will look like that portion of FIGS. 3, 4 and 5, located within the dashed line rectangles.

Each individual channel is transmitted to the cathode ray oscilloscope by its respective gate tube as already indicated. The manner in which a given gate tube, e.g., tube 144, is opened for allowing passage of the signals therethrough has been pointed out above. The ring counter 148 (see FIG. 9) acts to provide gate opening pulses for the gate tubes in a sequential manner continuously. Thus, there is a continuous high-speed scanning action that is controlled by the ring counter 148 and acts to open the gate tubes sequentially, one at a time. The ring counter 148 has a plurality of twin triodes corresponding to the twin triode 150 already described in connection with channel one. Thus, there are twin triodes 160 and 161 that are each connected as a flip-flop circuit, in the same manner as twin triode 150. Furthermore, the output gate-opening pulse from twin triode or flip-flop circuit 160 is passed to the grid of gate tube 145 via a connection from a point 162 in the plate circuit of the left-hand triode in tube 160. This gate-opening pulse circuit also includes a capacitor 163 and a resistor 164. Similarly twin triode 161 has a corresponding gate-opening pulse circuit which includes a point 167 and a capacitor 168 as well as a resistor 169.

The action of the ring counter 148 is straight-forward insofar as the flip-flop action which takes place with any given pair of tubes when connected for such action. Specifically, in the ring counter illustrated in FIG. 9, there is a common circuit connection 170 that is connected to a high frequency pulse generator as indicated by the caption. This pulse rate determines the speed with which flip-flop tubes 150, 160 and 161 are shifted from one state to the other in sequence. It will be noted that each flip-flop pair, or twin triode 150, 160 and 161 is connected so as to switch the next pair, in order, around the ring of flip-flop circuits. This may be readily traced by noting the action which takes place. Beginning with a given state of the twin triode tubes, such that one of them, e.g. tube 150, is conducting on the left-hand triode path thereof while all of the other twin triodes stand in the opposite state, i.e., are conducting on the right-hand half (as viewed in FIG. 9); the circulating action may be described as follows. As soon as a pulse is received over the circuit wire 170, it tends to drive all the cathodes on the left-hand triode of each flip-flop pair, positive. This has no effect on tubes 160 or 161, by reason of the fact that the left-hand triode of each of these tubes stands in a mon-conducting state. So that this pulse, which has a tendency to make the connected tubes non-conducting, does not change the situation. However, at the twin tube 150, the left-hand triode thereof stands in a conducting state and therefore the pulse tends to drive it into a non-conductive state. As this takes place, the well-known flip-flop action is carried out in twin triode 150 so that the right-hand triode path thereof becomes conducting while the left-hand path is cut off. At the same time as this flip-flop action takes place, a signal is transmitted from the right-hand triode path of tube 150 via a point 171 in the plate circuit thereof, and via a capacitor 172 to the grid circuit of the right-hand triode path in twin-triode 160. This signal is of a polarity such that it tends to drive this right-hand triode (in tube 160) to cut off; which acts, in turn to flip the twin triode 160 over to the opposite state such that its left-hand triode becomes conducting while the right-hand triode is cut off. Therefore, following the first pulse on circuit 170, as so far considered, twin-triode 150 was switched over so as to provide an output gate-opening pulse; and at the same time the next succeeding twin-triode 160 was switched over to the opposite state, such that it will be ready to be switched back again upon receipt of the next pulse.

Now when the next pulse is received on circuit 170, it will have no effect on twin-triode 150 or twin-triode 161. But it will provide the switching action on twin-triode 160, which action is the same as that just described in connection with switching of twin-triode 150. Consequently, as twin-triode 160 is now switched over again, it will provide an output gate-opening pulse via point 162, capacitor 163 and resistor 164, to cause gate tube 145 to be opened. At the same time it will provide an output switching pulse from a point 175 and via a capacitor 176, to the grid circuit of the right-hand triode path in twin-triode 161. Consequently, after this second pulse has been received, the first two twin-triodes 150 and 160 have been switched to provide their gate-opening pulses in sequence, and have remained in the switched state of being conducting on the right-hand triode path thereof. Thus it will be evident that the action continues in a circulating manner, from each of the twin triode tubes in succession, with a return to the first twin-triode 50 following the switching of the last twin-triode 161; when it provides its gate-opening output pulse via the corresponding circuit including point 167, capacitor 168 and resistor 169. And also, when twin-triode 161 provides a switching pulse back to twin triode 150 via a point 179 and a capacitor 180, to the grid circuit of the right-hand tube path of twin-triode 150.

In order to provide a susbtantially continuous display of all of the signals from the plurality of channels as picked up at the separate magnetic trace heads, the opening of the individual gate tubes 144, 145 and 146 is provided at a relatively high repeat rate, so that in effect each channel has its signal passed for relatively short duration (practically instantaneous) values of the signal being transmitted. These values are repeated at a high-enough rate to effectively display a continuous visual trace of the signal characteristics.

As an example of this sequential and repetitive scanning of the entire set of channels, it is to be noted that a satisfactory rate for the switching operation has been found to be fifty kilocycles. Thus, the ring counter is provided with a fifty kilocycle control pulse on circuit wire 170 for causing the successive flip-flop action of the pairs of tubes 150, 160 and 161 to take place. Therefore, the cathode-ray oscilloscope beam is sequentially shifted from one signal channel to the next, as received at the outputs of the individual gate tubes 144, 145 and 146, with the time spacing of twenty micro-seconds, so that the beam completes a sequential shift from one channel to the next every twenty micro-seconds and covers all twelve channels five thousand times in one-tenth of a second. Consequently, each trace has instantaneous values of its signal determined once every twelfth time for the fifty kilocycle rate of shift from one channel to the next. Therefore, each trace is actually comprised of a succession of dots spaced apart by about two hundred and twenty micro-seconds (two hundred and forty microseconds for a complete scan of all twelve channels, minus the twenty micro-seconds for a dot of that trace).

By reason of the sequential application of the gate opening signals to the various channels, the dots of the successive channel signals, which channel signals are staggered vertically, will in turn be staggered horizontally relative to the adjacent channels. Now it will be clear that these individual dots (or instantaneous values) for the separate channel signals, occur close enough together to provide, visually, a continuous display for each signal.

Figure 3:
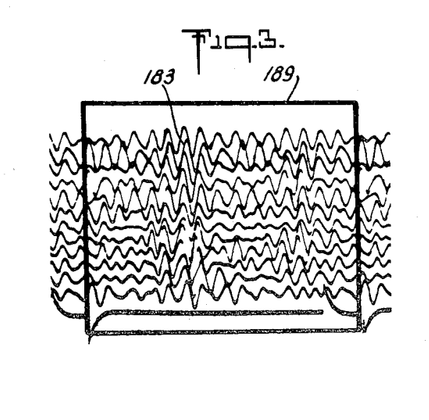
FIGS. 3, 4 and 5 are illustrations of that portion of the record illustrated in its entirety in FIG. 2, which portion is shown enclosed by a dashed line rectangle and is that which is repeated a plurality of times for display and observation on a cathode ray oscilloscope. The particular records shown in these figures, illustrate the effects of an adjustment which may be carried out during the analysis and observation of the recorded data.
Figure 4:
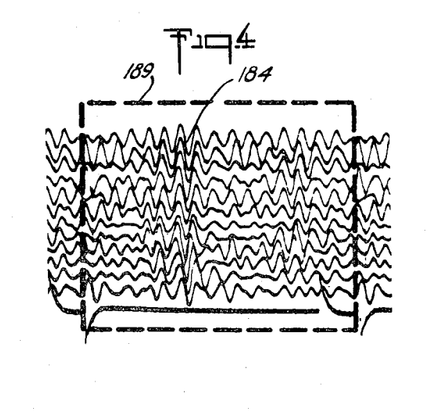

One of the benefits that may be obtained by reason of this invention is the ability to observe corrections as they are applied, e.g., either phase shift corrections or filter adjustments. One example of phase shift correction for a single channel is that illustrated in FIGS. 3, 4, and 5 where the effect of making a relative time, or phase, adjustment on a given one of the traces is shown. Such adjustment is made as the signals are picked up from the magnetic drums 61 and 62, by moving circumferentially a given one of the adjustable head pickups 57, 58 or 59. FIG. 3 illustrates the conditions where the second trace 183 (counting downward from the top as illustrated in FIG. 3) indicates that by reason of a difference in the weathering layer velocity of whatever cause, the reflection "pick" for this trace (indicated by reference number 183) is delayed considerably in phase relative to the adjacent traces on the record. Now by adjusting the circumferential position of the corresponding pickup head on the adjustable head drums, the trace signal 183 may be adjusted in phase position (as the portion of the record chosen is being observed) so as to line up with the adjacent traces. The results of a proper adjustment is illustrated in FIG. 4, where the adjusted trace is indicated by reference number 184.

Figure 5:
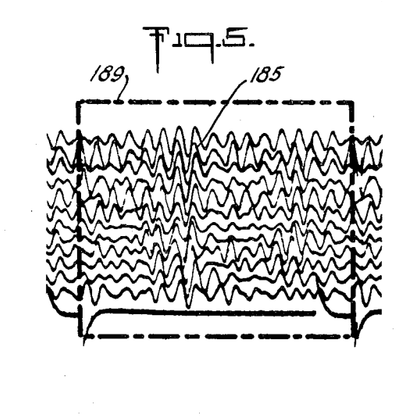

As an illustration of the versatility of the adjustment in relative phase position, which may be carried out by the movable head pickups, FIG. 5 shows the same trace after its adjustable head has been further moved circumferentially to the point that the trace of its signal (as shown by the reflection "pick" 185 thereof) is out of phase leading rather than lagging, as was the case originally in the FIG. 3 illustration. Thus, in FIG. 5, it may be noted that the trace including the trough, or reflection "pick," numbered 185 has been adjusted as indicated, to move the phase position even beyond a correct in-line phase relative to its adjacent traces.

Figure 2:
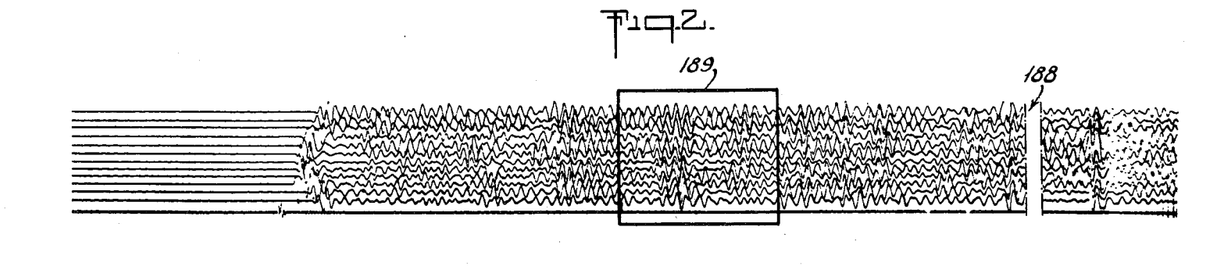
FIG. 2 shows a sample record as it might be reproduced from a magnetic tape and recorded in the form of a photographic film strip.

The record illustrated in FIG. 2 shows the signal conditions as originally taken from the magnetic tape record, without corrections for relative phase position of the traces. The entire record is not shown by reason of its length, but a representative portion is illustrated with a break 188 indicated in the drawing.

FIG. 3 merely illustrates the same conditions as existed for the record of FIG. 2, but after a short portion 189 of the record that is shown enclosed by the dashed lines 189, has been taken off to be continuously repeated for the purpose of applying these signals to the cathode-ray oscilloscope for observation and analysis of the status of the various signals.

It is to be noted that although the various methods and showings of apparatus for carrying out the invention are all directed to the use of a magnetic recording that employs frequency modulated magnetic recording such that no erase heads or the like are necessary, it will be clear to anyone skilled in the art that the principles involved may be applied to the use of direct magnetic recording as distinguished from A.C. carrier modulated type. If direct, or D.C. recording equipment is employed, the required use of erase heads and the like will be necessary. Furthermore, in regard to the modification illustrated in FIG. 10, it will be appreciated that should direct magnetic recording equipment be employed, it would be particularly advantageous to make use of a rewrite of the information as first taken from the original or master drum signals, once each revolution of the adjustable head or circulating drums 61a and 62a. Such rewrite of the original signals would avoid deterioration of the signals such that the length of time that the signals could be viewed for analysis would be limited.

It is also pointed out that another way of carrying out the broader aspects of the invention might be one where the entire record is repeatedly scanned at a sufficiently high speed, such that the frequency of repetition of the changing signals over the length of the record would be short enough to make feasible a display of the data on the cathode ray oscilloscope. Then in order to overcome the consequent condensing effect of this high-speed scanning of the entire record, a predetermined short-time duration portion of the entire record might be picked off and such short portion displayed over the entire face of the cathode ray oscilloscope by using known delay circuits in connection with the display of the signals on the oscilloscope tube. However, if this arrangement is employed, the section of the record displayed will not be in terms of real time as is the case with the other modifications shown and described herein.

While certain embodiments, including methods and apparatus involved in the carrying out of this invention, have been described in considerable detail in accordance with the applicable statutes, this is not to be taken as in any way limiting the invention but merely as being descriptive thereof.

It is claimed:

1. A system for analyzing a seismic record having a time duration from beginning to end of an order of magnitude too great for a feasible repetition rate in making a display on a cathode ray oscilloscope, comprising in combination means for reading said entire seismic record from beginning to end at said relatively long time duration rate, means for reproducing a predetermined short time duration portion of said record a plurality of times successively with substantially no time interval between said reproductions, and means for displaying said short time duration portion on said cathode ray oscilloscope, the repetition rate of said display being substantially equal to the reciprocal of said short time period.

2. A system for analyzing a seismic record having a time duration from beginning to end of an order of magnitude too great for a feasible repetition rate in making a display on a cathode ray oscilloscope, comprising in combination means for reading said record at said relatively long time duration rate, means for reproducing a predetermined short time duration portion of said record a plurality of times repeatedly in immediate succession, and means for reading said short portion as successively reproduced including circuit means for connecting the said short portion as read to said cathode ray oscilloscope for display thereon.

3. A system for analyzing and determining corrections for a magnetically recorded seismic record having a time duration from beginning to end of an order of magnitude too great for a feasible repetition rate in making a display on a cathode ray oscilloscope, comprising in combination means for reading a predetermined short time duration portion of said record, means for reproducing said short time duration portion magnetically a plurality of times in immediate succession on a separate magnetic medium, means for reading said last named successively reproduced portion, and means for introducing said successively reproduced portion as read to said cathode ray oscilloscope for analysis and correction determination.

4. A system for analyzing and determining corrections for a magnetically recorded seismic record having a time duration from beginning to end of an order of magnitude too great for a feasible repetition rate in making a display on a cathode ray oscilloscope, comprising in combination a magnetic tape having said record recorded thereon, means for reading said record from said tape, means for reproducing a predetermined short time duration portion of said record as read, said portion being reproduced a plurality of times in immediate succession on a separate magnetic medium, means for reading said short portion as successively reproduced, and means for connecting said last named reading means to said cathode ray oscilloscope for observation of said short portion in order to analyze same.

5. A system for analyzing and determining corrections for a magnetically recorded seismic record having a time duration from beginning to end of an order of magnitude too great for a feasible repetition rate in making a display on a cathode ray oscilloscope, comprising in combination a magnetic tape having said record recorded thereon, means for reading said record from said tape, means for reproducing a predetermined short time duration portion of said record as read, said portion being reproduced a plurality of times in succession on a separate magnetic medium, said reproducing means including a timer for determining the termination point of said short portion and means for determining the length of the short portion, means for reading said short portion as successively reproduced, and means for connecting said last named reading means to said cathode ray oscilloscope for observation of said short portion in order to analyze same, said connecting means including an electronic switch for introducing the information from each of the individual traces of said record separately for simultaneous viewing thereof.

6. A system for analyzing and determining corrections for a magnetically recorded seismic record having a time duration from beginning to end of an order of magnitude too great for a feasible repetition rate in making a display on a cathode ray oscilloscope, comprising in combination a magnetic tape having said record recorded thereon, means for reading said record from said tape, means for reproducing a predetermined short time duration portion of said record as read, said portion being reproduced a plurality of times in succession on a separate magnetic medium, said reproducing means comprising a timer, circuit means for introducing a trip signal to said timer for commencing a predetermined time period related to the beginning of said record, first means controlled by said timer for determining the termination point of said short portion, means including magnetic medium having a predetermined length for determining the length of said short portion and second means controlled by said timer for introducing a timing pulse signal to said magnetic medium to act as a synchronous timing pulse when said short portion is read out, means for reading said short portion as successively reproduced, and circuit means for connecting said last named reading means to said cathode ray oscilloscope including a separate circuit for said synchronous timing pulse and an electronic switch for introducing the information from each of the record information traces to said oscilloscope.

7. A system for analyzing and determining corrections for a magnetically recorded seismic record having a time duration from beginning to end of an order of magnitude too great for a feasible repetition rate in making a display on a cathode ray oscilloscope, comprising in combination a magnetic tape having said record recorded thereon, first drum means for supporting said tape wrapped around the circumferential surface thereof, means for reading said record from said tape, second relatively small diameter drum means having a magnetic medium disposed on the circumferential surface thereof, circuit means for transferring a portion of said record as read from said tape to the surface of said small drum means, control means including timing means for determining the location on the whole record of said portion to be transferred, third drum means having magnetic medium disposed on the circumferential surface thereof, other circuit means for transferring said portion of the record from said second small drum means to the surface of said third drum means a plurality of times in succession, a cathode ray oscilloscope, and additional circuit means for transferring said portion of the record as repeated on the surface of said third drum means to said cathode ray oscilloscope.

8. A system for analyzing and determining corrections for a magnetically recorded seismic record having a time duration from beginning to end of an order of magnitude too great for a feasible repetition rate in making a display on a cathode ray oscilloscope, comprising in combination a magnetic tape having said record recorded thereon, said record comprising a plurality of tracks in parallel on said tape, means for reading said record from said tape including a first drum having said tape disposed on the circumferential surface thereof, second relatively small diameter drum means having a magnetic medium disposed on the circumferential surface thereof, circuit means for transferring a short length portion of said record as read from said tape including said plurality of tracks to the surface of said small drum means, control means including timing means for determining the location on the whole record of said portion to be transferred, third drum means having magnetic medium disposed on the circumferential surface thereof, other circuit means for transferring said portion of the record from said second small drum means to the surface of said third drum means a plurality of times in succession, a cathode ray oscilloscope, additional circuit means for transferring said portion of the record as repeated on the surface of said third drum means to said cathode ray oscilloscope, said last named means including an electronic switch for introducing all of the signals from said plurality of tracks to the input of said cathode ray oscilloscope at a rapid scan rate in order to provide for a separate but simultaneous display of all of the tracks over the short length portion of the record.

9. A system for analyzing and determining corrections for a magnetically recorded seismic record having a time duration from beginning to end of an order of magnitude too great for a feasible repetition rate in making a display on a cathode ray oscilloscope, comprising in combination a magnetic tape having said record recorded thereon, means for reading said record from said tape, means for reproducing a predetermined short time duration portion of said record as read, said portion being reproduced a plurality of times in succession on a separate magnetic medium, said reproducing means comprising a timer, circuit means for introducing a trip signal to said timer for commencing a predetermined time period related to the beginning of said record, first means controlled by said timer for determining the termination point of said short portion, means including magnetic medium having a predetermined length for determining the length of said short portion and synchronous pulse generating means controlled by said timer for providing a timing pulse to said magnetic medium marking the end of said short portion of said record including widely different frequency oscillators and means for switching instantaneously from one frequency to the other, means for reading said short portion as successively reproduced, and circuit means for connecting said last named reading means to said cathode ray oscilloscope including a separate circuit for said synchronous timing pulse and an electronic switch for introducing the information from each of the record information traces to said oscilloscope.

10. A system for analyzing and determining corrections for a magnetically recorded seismic record having a time duration from beginning to end of an order of magnitude too great for a feasible repetition rate in making a display on a cathode ray oscilloscope, comprising in combination a magnetic tape having said record recorded thereon, first drum means for supporting said tape wrapped around the circumferential surface thereof, means for reading said record from said tape, second drum means having a continuous layer of magnetic medium disposed on the circumferential surface thereof, circuit means for transferring a portion of said record as read from said tape to the surface of said second drum means, control means including timing means for determining the location on the whole record of said portion to be transferred, second means for reading said portion of the record from said second drum means, additional circuit means for re-transferring said portion of the record as read from said second drum means back onto the surface thereof at a distance from said second reading means equal to the length of said portion of the record, a cathode ray oscilloscope, and third circuit means for transferring said portion of the record as read from said second drum means to said cathode ray oscilloscope simultaneously with the re-transfer thereof back onto the second drum means surface.

11. A system for analyzing and determining corrections for a magnetically recorded seismic record having a time duration from beginning to end of an order of magnitude too great for a feasible repetition rate in making a display on a cathode ray oscilloscope, comprising in combination a magnetic tape having said record recorded thereon, said record comprising a plurality of tracks in parallel on said tape, first drum means for supporting said tape wrapped around the circumferential surface thereof, means for reading said record from said tape, second drum means having a continuous layer of magnetic medium disposed on the circumferential surface thereof, first circuit means for transferring a short length portion of said record as read from said tape including said plurality of tracks to the surface of said second drum means, control means including timing means for determining the location on the whole record of said portion to be transferred, second means for reading said portion of the record from said second drum means, second circuit means for retransferring said portion of the record as read from said second drum means back onto the surface thereof at a distance from said second reading means equal to the length of said short portion, a cathode ray oscilloscope, and third circuit means for transferring said portion of the record as read from said second drum means to said cathode ray oscilloscope simultaneously with the re-transfer thereof, said last named means including an electronic switch for introducing all of the signals from said plurality of tracks to the input of said cathode ray oscilloscope at a rapid scan rate in order to provide for a separate but simultaneous display of all of the tracks over the short length portion of the record.

References Cited in the file of this patent
UNITED STATES PATENTS

| | | |
|---|---|---|
| 2,158,285 | Koch | May 16, 1939 |
| 2,308,390 | Ritzmann | Jan. 12, 1943 |
| 2,517,986 | Dickinson | Aug. 8, 1950 |
| 2,825,886 | Pittman | Mar. 4, 1958 |
| 2,889,547 | Wesley | June 2, 1959 |
| 2,912,672 | Loper | Nov. 10, 1959 |